(12) United States Patent
Guzman et al.

(10) Patent No.: US 10,391,845 B2
(45) Date of Patent: Aug. 27, 2019

(54) DOOR ASSEMBLY STABILITY SYSTEMS FOR PUBLIC TRANSPORTATION

(71) Applicant: Railcar Parts Manufacturing, Inc., Signal Hill, CA (US)

(72) Inventors: John D Guzman, Signal Hill, CA (US); Cindy Marie Guzman Reyes, Signal Hill, CA (US)

(*) Notice: Subject to any disclaimer, the term of this patent is extended or adjusted under 35 U.S.C. 154(b) by 289 days.

(21) Appl. No.: 15/253,696

(22) Filed: Aug. 31, 2016

(65) Prior Publication Data

US 2018/0056761 A1    Mar. 1, 2018

(51) Int. Cl.
*B60J 5/06* (2006.01)
*B61D 19/00* (2006.01)
*B61D 19/02* (2006.01)

(52) U.S. Cl.
CPC ............ *B60J 5/062* (2013.01); *B61D 19/005* (2013.01); *B61D 19/02* (2013.01); *Y02T 30/30* (2013.01)

(58) Field of Classification Search
CPC ............................... B60J 5/062; B61D 19/005
See application file for complete search history.

(56) References Cited

U.S. PATENT DOCUMENTS

| | | | | |
|---|---|---|---|---|
| 3,587,477 A | * | 6/1971 | Ferris et al. ......... | B61D 19/005 105/378 |
| 4,043,274 A | * | 8/1977 | Snyder .................. | B61D 19/00 105/409 |
| 2015/0217785 A1 | * | 8/2015 | Mair ..................... | B61D 19/008 49/176 |
| 2016/0290025 A1 | * | 10/2016 | Joren ......................... | E05F 7/04 |
| 2016/0319583 A1 | * | 11/2016 | Ritt ......................... | B61D 19/02 |
| 2018/0056761 A1 | * | 3/2018 | Guzman .............. | B61D 19/005 |

* cited by examiner

*Primary Examiner* — Jason C Smith
(74) *Attorney, Agent, or Firm* — Sandra P. Thompson; Finlayson Toffer Roosevelt & Lilly LLP

(57) ABSTRACT

A door assembly system for public transportation that includes: a public transportation vehicle having an outer shell and an inner passenger compartment; at least one door having an outer surface, an inner surface, a top, a bottom and two sides, wherein the door slides to open so that passengers can enter or exit the inner passenger compartment; a C-shaped rail, wherein the rail is coupled to the outer shell of the vehicle; and a coupling component that is coupled to the inner surface of the door and is designed to mate with or engage with the C-shaped rail in a slideable manner. A method of securely opening a door on public transportation that includes: providing a train, bus or public transportation vehicle having an outer shell and an inner passenger compartment; providing at least one door having an outer surface, an inner surface, a top, a bottom and two sides, wherein the door slides to open so that passengers can enter or exit the inner passenger compartment; providing a door assembly kit, the kit comprising a C-shaped rail and a coupling component; installing the C-shaped rail to the outer shell of the vehicle; installing the coupling component to the inner surface of the door, opening the door; and mating or engaging the coupling component with the C-shaped rail in a slideable manner.

16 Claims, 7 Drawing Sheets

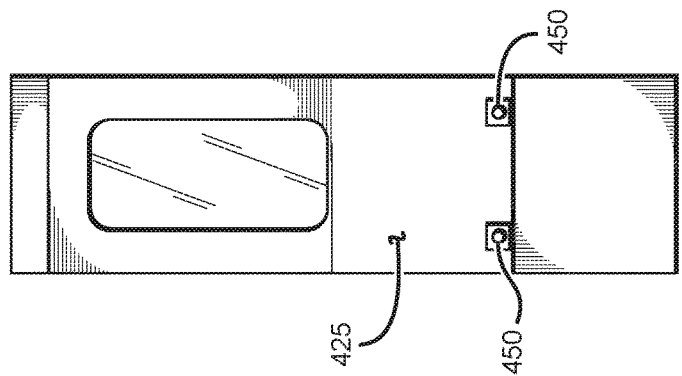
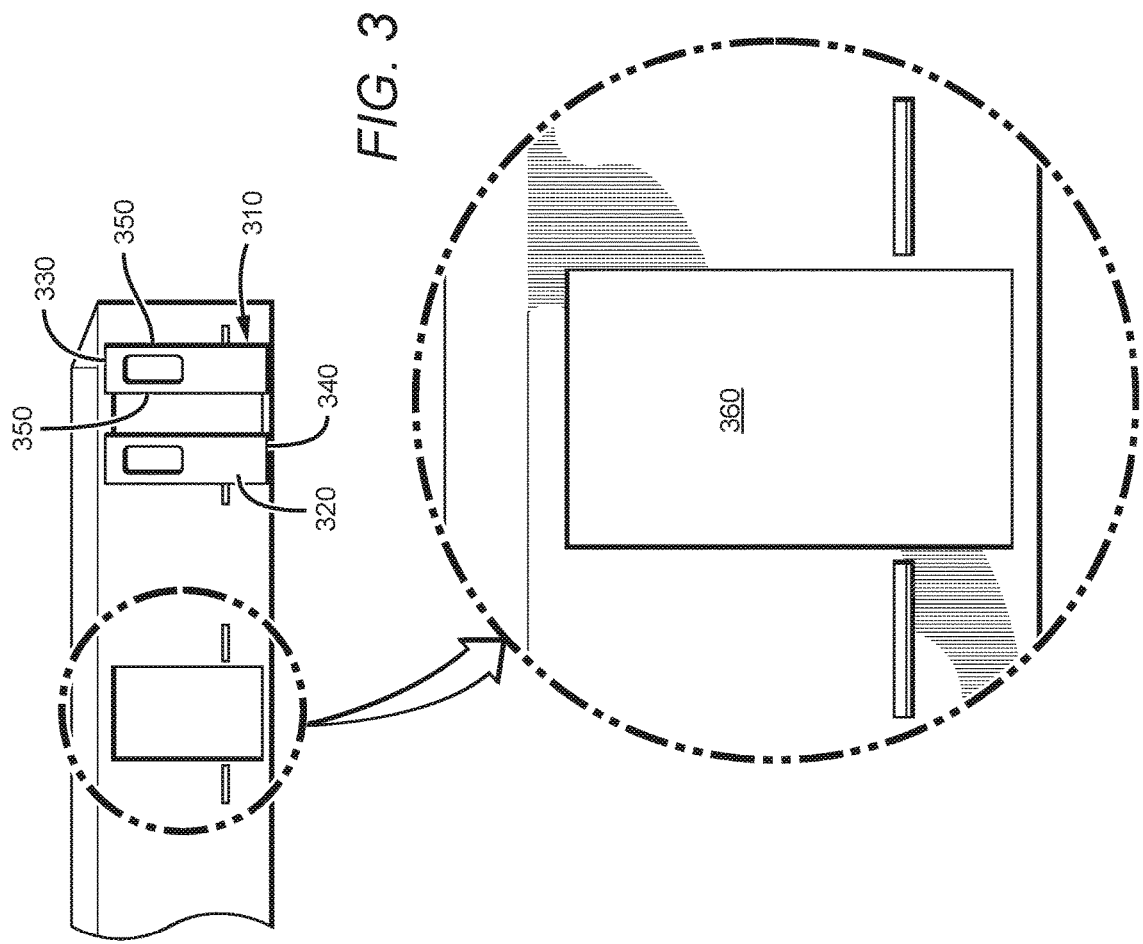

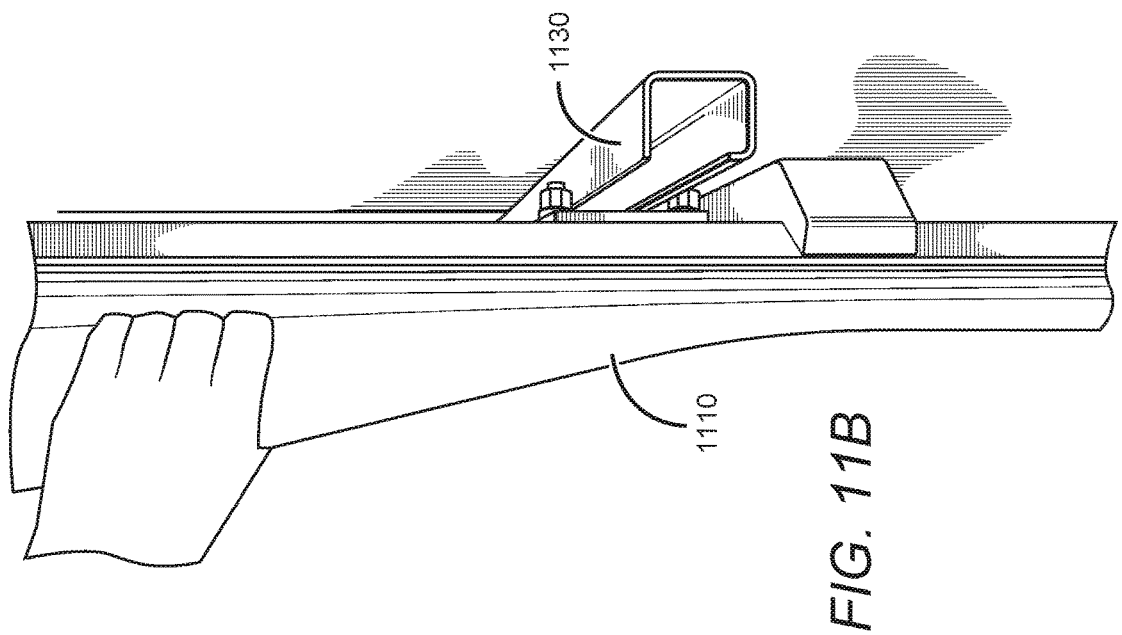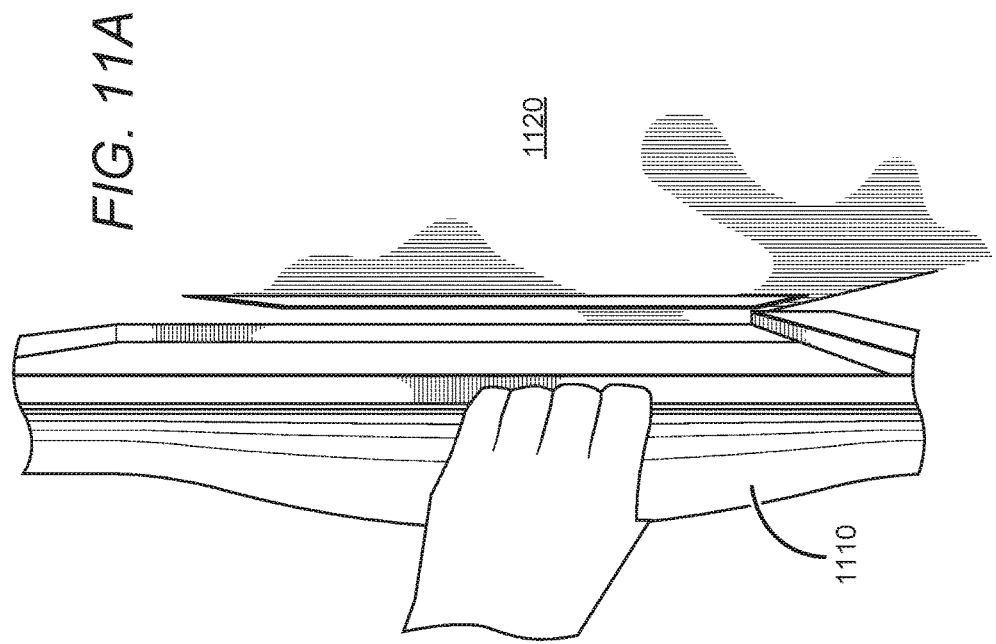

DOOR ASSEMBLY STABILITY SYSTEMS FOR PUBLIC TRANSPORTATION

FIELD OF THE SUBJECT MATTER

The field of the subject matter is door and door stability assemblies—whether in kit form or built in—for public transportation.

BACKGROUND

Public transportation is used daily by millions of people in a number of countries, including the United States. As part of this effort to move a lot of people from one place to another in an efficient manner, buses and trains have evolved to operate in a way that decreases fuel consumption, decreases individual man hours, increases safety considerations, and provides for the maximum amount of mechanical operation.

Public transportation has evolved to create entry ways where passengers can enter and exit the vehicle quickly and efficiently. As part of this design effort, exit and entry doors are made larger or multiple doors are used to protect and make accessible one large entry or exit way.

As public transportation expands out into already built-up areas, such as cities, the buses and trains must be flexible. For example, the doors must slide from side to side, as opposed to opening outward or opening inward inside the passenger compartment, so that they can open anywhere there are tight spaces or crowded buses and trains. These buses and trains have an outer shell that is exposed to the elements and an inner shell or inner passenger compartment where passengers and their various items, such as bikes, wheelchairs, bags, computers and service animals, reside while the train or bus travels its route. The outer shell is usually metal or a metal composite that is lined with the material used for the inner passenger compartment, which is usually a polymer-based material, especially in newer trains and buses. For older models, the inside of the train or bus may also be a metal shell.

In some buses and trains, such as those in the SEPTA system in Philadelphia, the doors slide into the shell of the train or bus—the invisible door that slides between panels. However, this design isn't always desirable or feasible in newer trains. These new trains are designed to have thinner shells and be lighter overall to save energy and overall costs.

If the shell of the train or bus is too thin to allow the doors to side into the shell cavity between the panels, then the doors must either move out from the outer shell or move into the inner cavity and slide either right or left to expose the entryway. It is unlikely that these doors would move into the inner cavity where passengers are, because it could be a safety hazard for those passengers. Also, most buses and trains are designed to allow passengers to store bicycles and wheelchairs by the door, so doors sliding into the passenger space would not be a suitable design.

Therefore, the modern design choice for doors on public transportation is for the doors 110 to pop out and away from the shell and the inner passenger cavity, and then to slide along 120 the outer shell of the bus or train to expose or open the entryway 130, as shown in FIG. 1. The doors that are designed this way usually have a track and related wiring at the top of the entryway, as shown in FIG. 2, so that the door moves along the track 240. However, when the door is full open, it is really only secured or anchored on one end. The other end is essentially exposed and not anchored or secured to the train or bus.

In the areas where the buses or trains traverse areas that are on inclines, declines or a mixture of the two, such as San Francisco, these doors open and they are likely going to swing away from the train. Not only can this create a safety hazard in tight places, but it can also put a significant strain on the operating wiring 210 and mechanisms 220 for the door/doors 230, as shown in FIG. 2. This stress or strain not only means that the train or bus will need more routine maintenance, which drives up cost, but it also means that these doors may fail from time to time, which could present a significant safety issue. A terrific example of the problems with train and bus doors is shown in the following video: http://youtu.be/XaZ77kwvSO8.

Therefore, appreciating that modern trains and buses are likely going to continue being designed with doors that pop out and slide either to the right or to the left outside of the train, it would be ideal to design a kit to allow the door to be guided and stabilized outside the train. For brand new trains and buses, they could be initially designed with extra stabilization built into the design without the need of a kit.

SUMMARY OF THE SUBJECT MATTER

A door assembly system for public transportation that includes: a public transportation vehicle having an outer shell and an inner passenger compartment; at least one door having an outer surface, an inner surface, a top, a bottom and two sides, wherein the door slides to open so that passengers can enter or exit the inner passenger compartment; a C-shaped rail, wherein the rail is coupled to the outer shell of the vehicle; and a coupling component that is coupled to the inner surface of the door and is designed to mate with or engage with the C-shaped rail in a slideable manner.

A method of securely opening a door on public transportation that includes: providing a train, bus or public transportation vehicle having an outer shell and an inner passenger compartment; providing at least one door having an outer surface, an inner surface, a top, a bottom and two sides, wherein the door slides to open so that passengers can enter or exit the inner passenger compartment; providing a door assembly kit, the kit comprising a C-shaped rail and a coupling component; installing the C-shaped rail to the outer shell of the vehicle; installing the coupling component to the inner surface of the door, opening the door; and mating or engaging the coupling component with the C-shaped rail in a slideable manner.

BRIEF DESCRIPTION OF THE FIGURES

FIG. 3 shows a contemplated bus or train door.

FIG. 4 shows a contemplated bus or train door.

FIG. 11A shows a contemplated train or bus door without the use of a contemplated embodiment.

FIG. 11B shows a contemplated train or bus door with the use of a contemplated embodiment.

DETAILED DESCRIPTION

Figure 1:
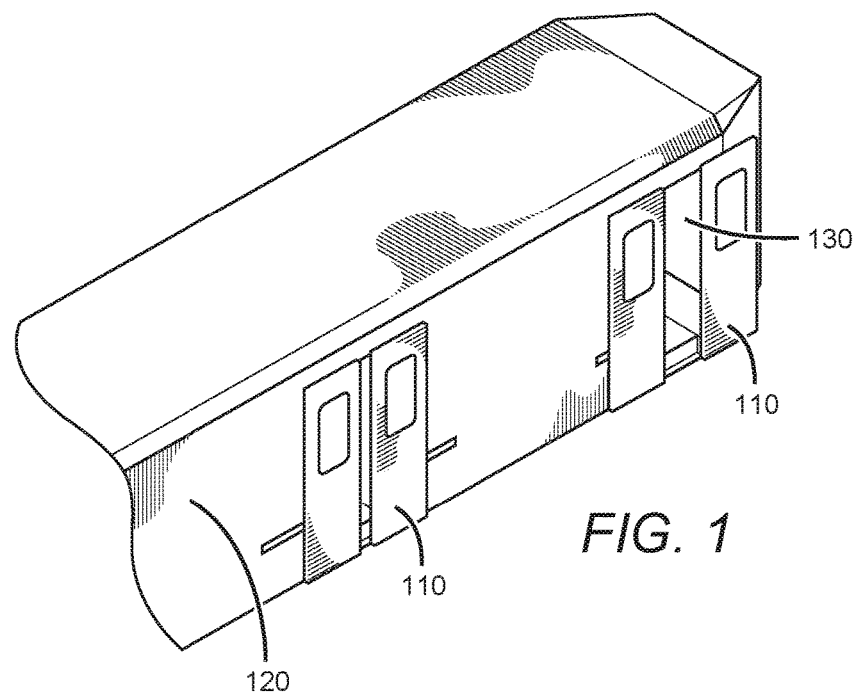
FIG. 1 shows a modern train car or rail car having doors that pop away from the inner passenger compartment and slide along the outer shell of the train car to open and allow passengers to exit the inner passenger compartment.

As mentioned earlier, appreciating that modern trains and buses are likely going to continue being designed with doors that pop out and slide either to the right or to the left outside of the train, as shown in FIG. 1, it would be ideal to design a kit to allow the door to be guided and stabilized outside the train. For brand new trains and buses, they could be initially designed with extra stabilization built into the design without the need of a kit. As described herein, a door assembly system and related methods have been developed that addresses the problems outlined earlier in an elegant fashion.

Figure 5:
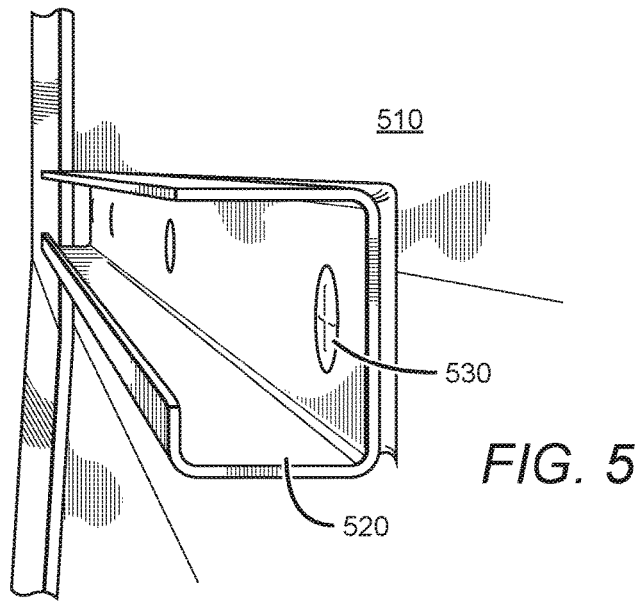
FIG. 5 shows a contemplated embodiment as disclosed herein.
Figure 6:
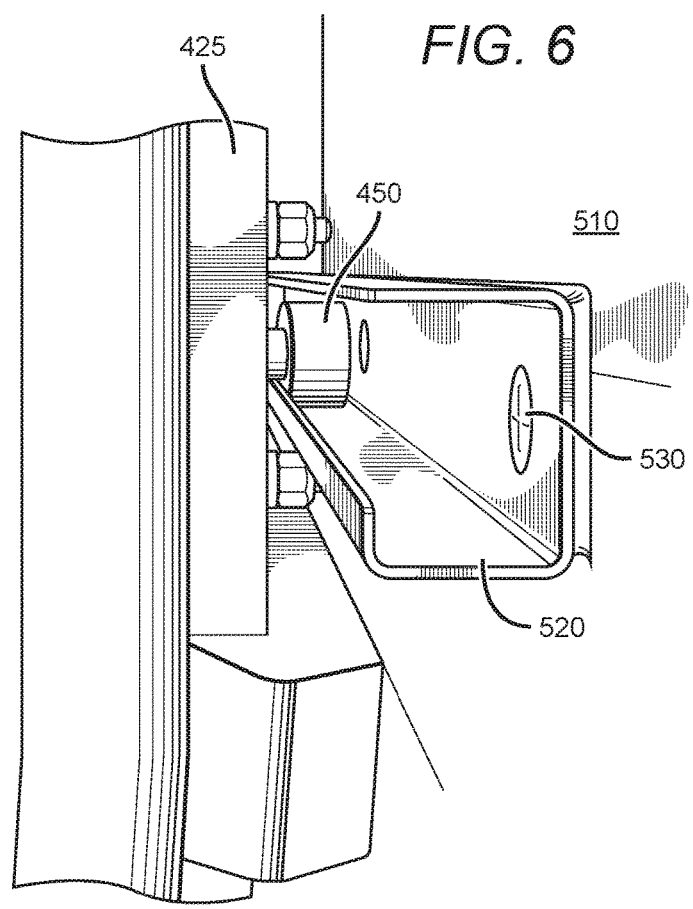
FIG. 6 shows a contemplated embodiment as disclosed herein.

Specifically, a door assembly system for public transportation is disclosed herein that includes: a public transportation vehicle having an outer shell and an inner passenger compartment, as shown in FIG. 1; at least one door 310 having an outer surface 320, an inner surface 425, a top 330, a bottom 340 and two sides 350, as shown in FIG. 3 and FIG. 4, wherein the door slides to open so that passengers (not shown) can enter or exit the inner passenger compartment through an opening 360; a C-shaped rail 520, as shown in FIG. 5, wherein the rail 520 is coupled to the outer shell 510 of the vehicle; and a coupling component 450 that is coupled to the inner surface of the door 425 and is designed to mate with or engage with the C-shaped rail in a slideable manner, as shown in FIG. 6.

Figure 7:
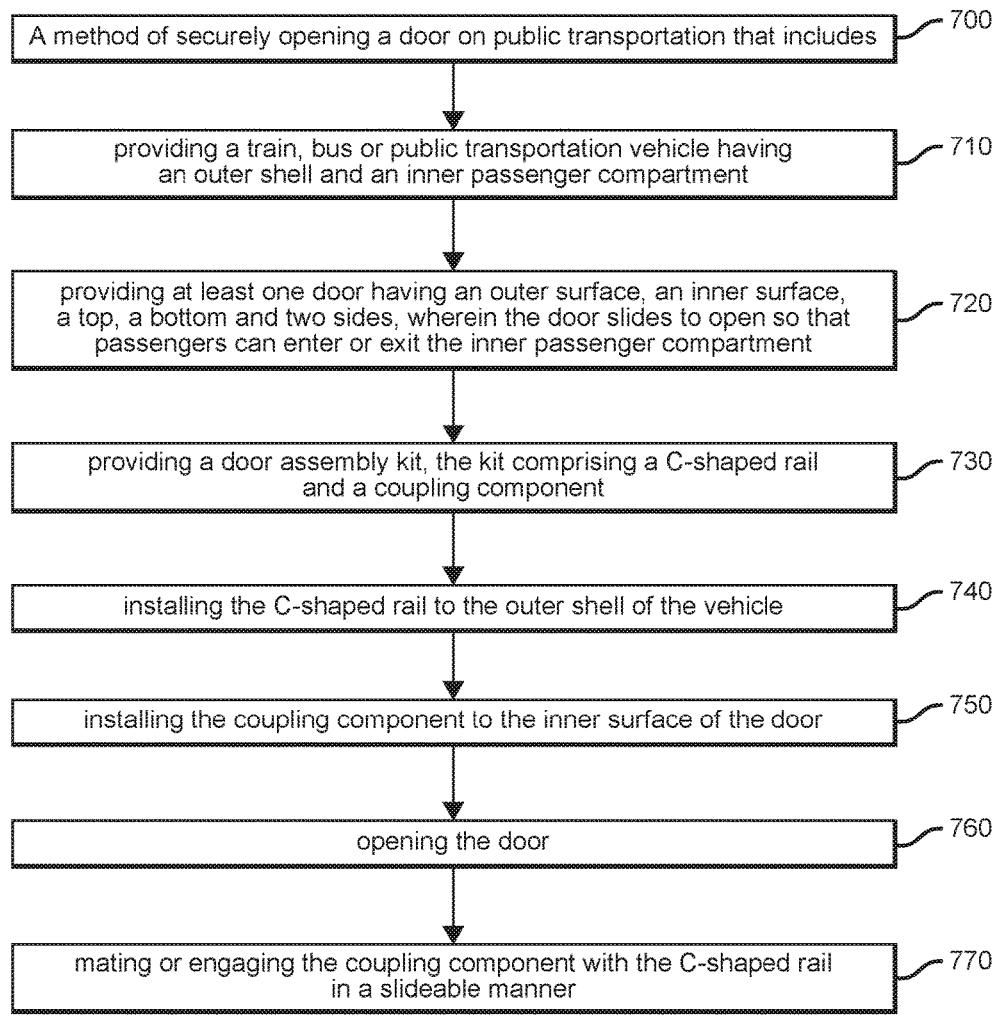
FIG. 7 shows a contemplated method.

A method 700 of securely opening a door on public transportation is also disclosed herein and shown in FIG. 7 that includes: providing a train, bus or public transportation vehicle having an outer shell and an inner passenger compartment 710; providing at least one door having an outer surface, an inner surface, a top, a bottom and two sides, wherein the door slides to open so that passengers can enter or exit the inner passenger compartment 720; providing a door assembly kit, the kit comprising a C-shaped rail and a coupling component 730; installing the C-shaped rail to the outer shell of the vehicle 740; installing the coupling component to the inner surface of the door 750; opening the door 760; and mating or engaging or directing the mating or engaging of the coupling component with the C-shaped rail in a slideable manner 770.

Public transportation and public transportation vehicles, as disclosed herein, comprise an outer shell that is exposed to the elements and outside weather and an inner passenger compartment where passengers stand or sit during transportation. As used herein, public transportation and public transportation vehicles comprise buses and trains, including rail cars and single rail car transportation, for the purposes of this application.

As contemplated herein, the at least one door means one or two doors that are used to cover or secure an entryway that is used by passengers to get on to or off of public transportation, such as a bus, a rail car or a train. In contemplated embodiments, the at least one door comprises an outer surface, an inner surface, a top, a bottom and two sides. A suitable outer surface is usually made from the same material as he outer shell or the surface of the public transportation vehicle, so that the door blends in with the vehicle when the door is closed. A contemplated door may have at least one window.

Figure 2:
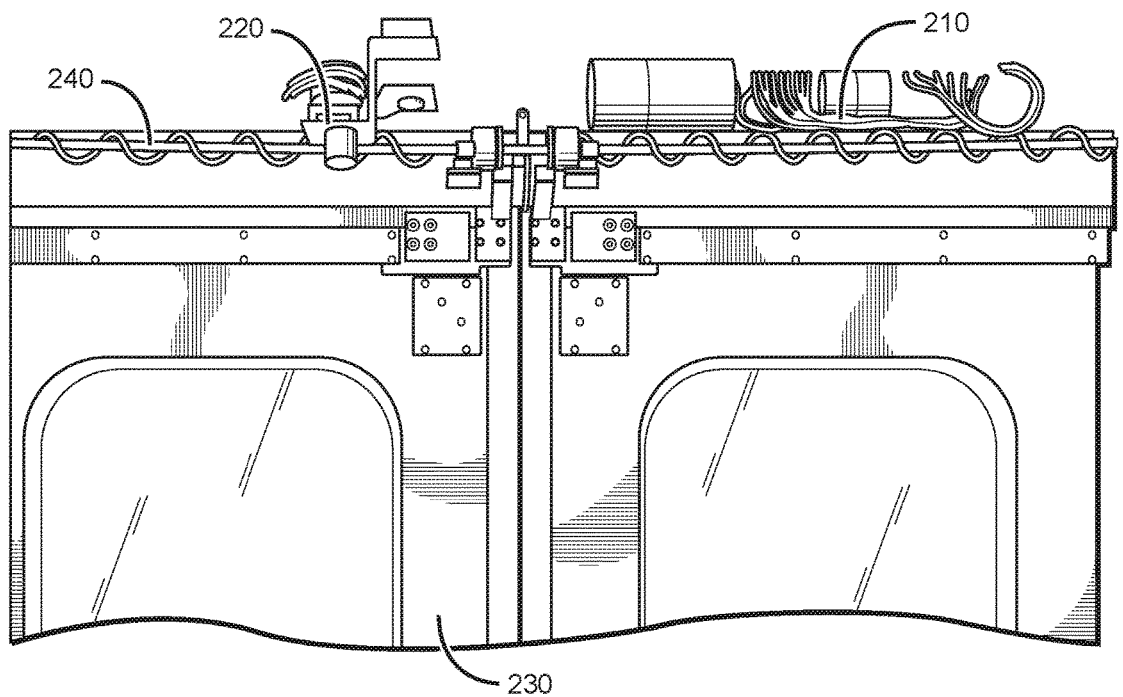
FIG. 2 shows an exposed view of the operating wiring and mechanisms for modern train or bus doors.

Contemplated doors slide or traverse from a center point to either the right or left to open and follow the same path in reverse to close. In contemplated embodiments, each door has a connection point to the shell of the vehicle that pushes or pops it out and away from the shell of the vehicle and then mechanically directs the door either to the right or to the left of the entryway, as shown in FIG. 2. A contemplated connection point is at the top of the door where the operating mechanisms or wiring is stored, so that it is out of the way of passengers, which is also shown in FIG. 2.

In a contemplated embodiment, a C-shaped rail is mechanically coupled to the outer shell of the vehicle at a 90-degree angle from a line drawn from the top to the bottom of the outer shell. FIG. 1 shows the C-shaped rail. In contemplated embodiments, the C-shaped rail is located about halfway between the top and bottom of the outer shell. In other embodiments, the C-shaped rail may be located closer to the top or bottom of the door.

In some embodiments, the C-shaped rail 520 is coupled to the outer shell 510 by a series of nuts and bolts or a nut and bolt assembly 530 that are strategically placed in order to ensure the rail is stationary and stabilized in a way that it can be engaged hundreds of times a day and does not need constant adjustment, as shown in FIG. 5.

A contemplated C-shaped rail may comprise any suitable material or combination of materials in order to be durable and withstand weather conditions. Contemplated rails may also be coated, anodized or treated in a way to make them more durable. In some embodiments, C-shaped rails may comprise a metal or combination of metals, composite materials, additives or a combination thereof.

Figure 8:
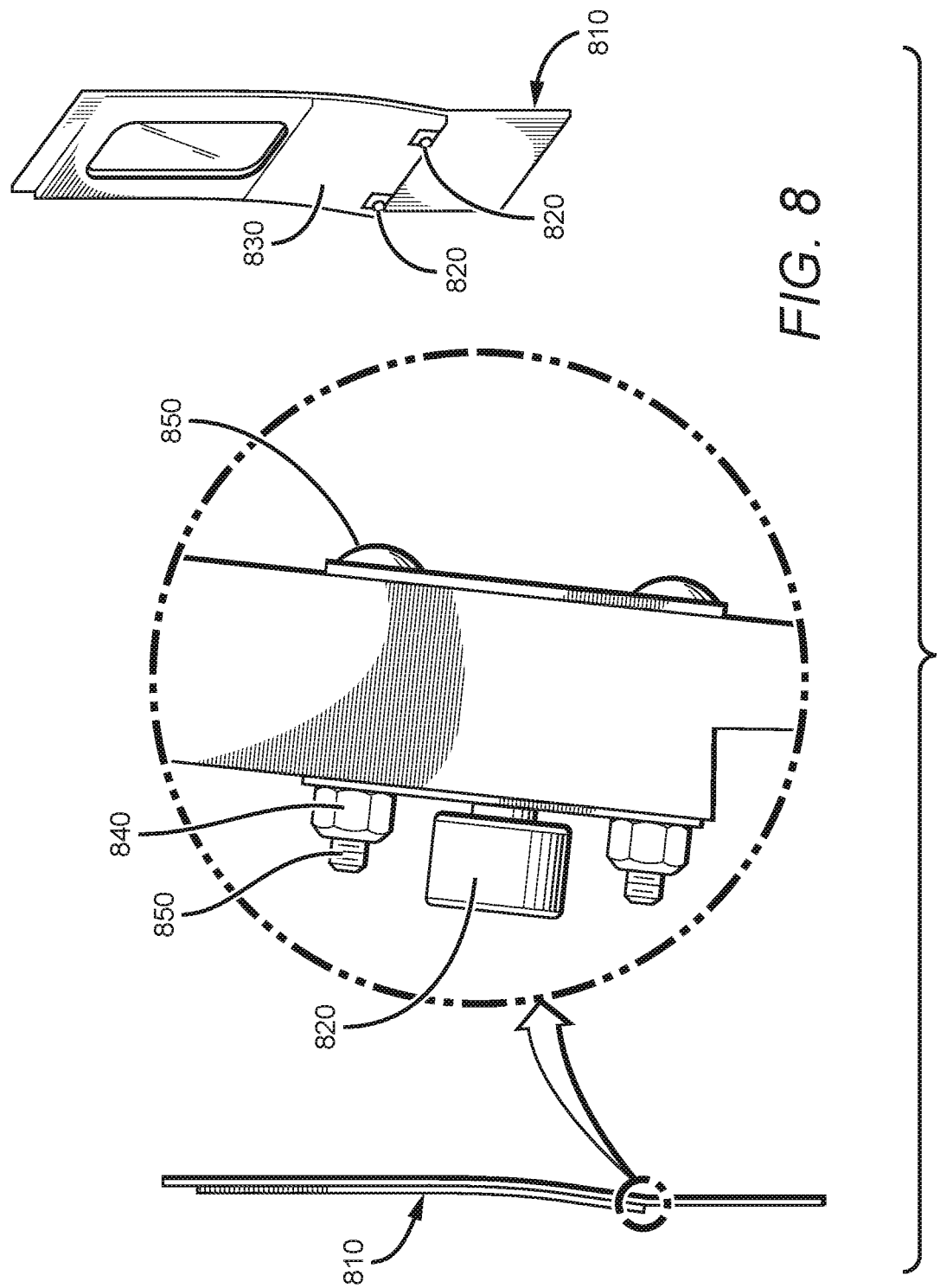
FIG. 8 shows a contemplated embodiment as disclosed herein.

A coupling component or assembly is also contemplated herein. It is coupled with the inner surface or inside surface or shell of each door and is designed to slideably mate and engage with the C-shaped rail. The coupling component is mechanically coupled to the inner surface of the door at a 90-degree angle from a line drawn from the top to the bottom of the inner surface of the door. FIG. 8 shows the coupling component. In contemplated embodiments, the coupling component is located about halfway between the top and bottom of the inner surface of the door.

In some embodiments, the coupling component 820 is coupled to the inner surface 830 of the door 810 by a series of nuts 840 and bolts 850 or a nut and bolt assembly, also shown in FIG. 8, that are strategically placed in order to ensure the coupling component is stationary and stabilized in a way that it can be engaged hundreds of times a day and does not need constant adjustment.

A contemplated coupling component may comprise any suitable material or combination of materials in order to be durable and withstand weather conditions. Contemplated coupling components may also be coated, anodized or treated in a way to make them more durable. In some embodiments, coupling components may comprise a metal or combination of metals, composite materials, additives or a combination thereof.

Figure 9:
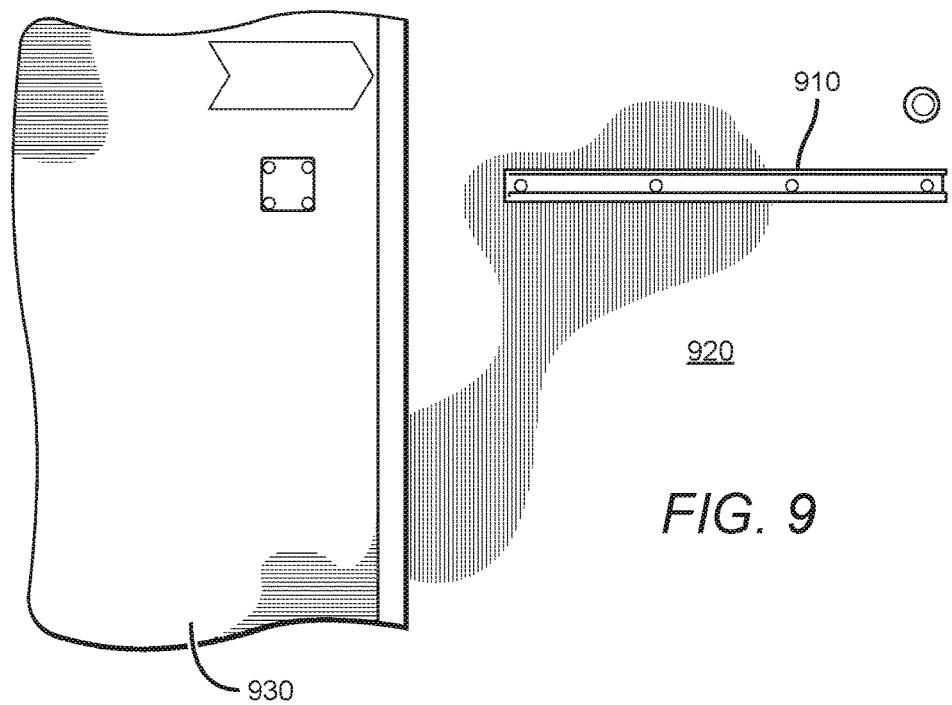
FIG. 9 shows a contemplated embodiment as disclosed herein.
Figure 10:
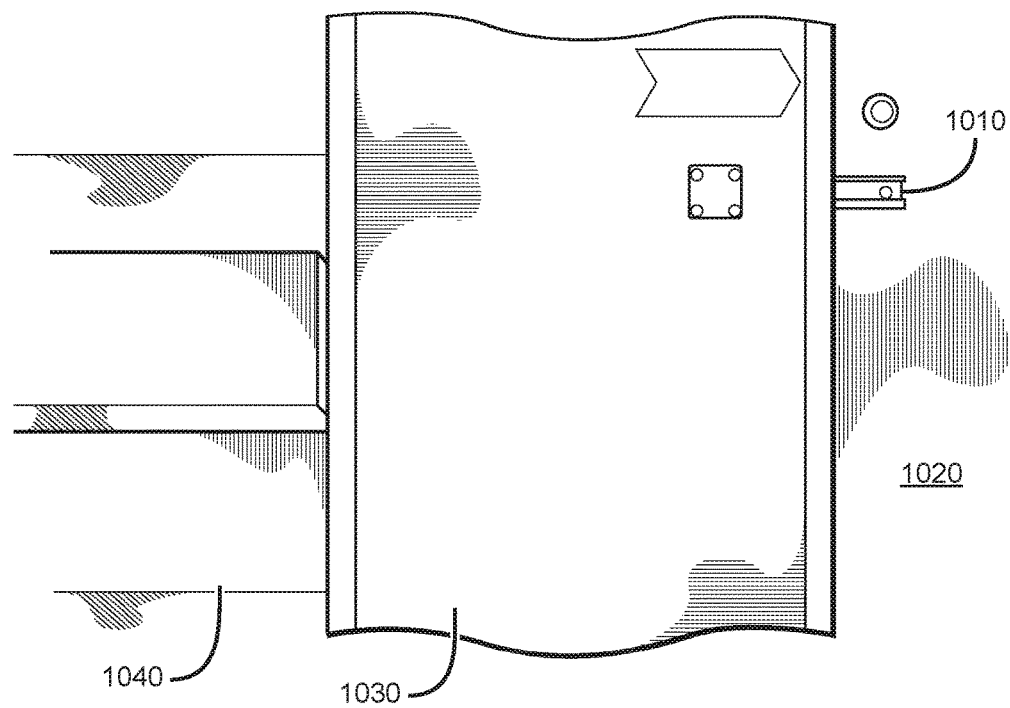
FIG. 10 shows a contemplated embodiment as disclosed herein.

Contemplated coupling components, as mentioned, mate and engage with the C-shaped rail, as shown in FIG. 6, as the door is sliding open. So, a suitable coupling component is a piece of material or a combination of materials that slideably engages or releasably slides or engages with the C-shaped component, so that the door cannot pull away from the outer shell of the vehicle. In some embodiments, a contemplated coupling component may comprise at least one bearing or series of bearings that allows for easy engagement of the coupling component with the C-shaped component. The premise of the door assembly is slideably locking the coupling component into the C-shaped component to provide a secure door assembly when the door is or doors are open, as shown in FIGS. 9 and 10. FIG. 9 shows the C-shaped component 910 that is coupled to the outer shell 920 of the bus or train car. The door 930 is closed in this Figure. FIG. 10 shows a partial view of the C-shaped component 1010 that is coupled to the outer shell 1020 of the bus or train car. The door 1030 is open in this Figure and the steps 1040 are visible where passengers enter the inner passenger compartment.

When the door slides back to close, the coupling component slideably disengages from the C-shaped component until the door reaches the point where it pops back into or drops back into place and the door is closed.

In some contemplated embodiments, a door assembly may be built into a new bus or train design, as opposed to a kit that is designed to retrofit current public transportation vehicles. In these embodiments, the C-shaped component may be molded with or formed with the outer shell of the public transportation vehicle.

As mentioned earlier, this new kit and design is very important for the public transportation industry, because their doors open and close hundreds of times a day and thousands of times a week. Contemplated door assemblies provide an elegant solution to the problem of overwhelming routine maintenance demands. FIG. 11A shows how the door 1110 can be pulled away from the train or bus 1120 fairly easily without the use of contemplated embodiments. FIG. 11B shows how stable the door 1110 is after installation of a contemplated embodiment 1130.

Thus, specific embodiments, methods of door assembly systems and door stability assembly systems for public transportation have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A door assembly system for public transportation, comprising:
    a public transportation vehicle having an outer shell and an inner passenger compartment;
    at least one door having an outer surface, an inner surface, a top, a bottom and two sides, wherein the door slides to open so that passengers can enter or exit the inner passenger compartment;
    at least one connection point that is coupled to the top of the at least one door and mechanically directs the at least one door to open or to close;
    a C-shaped rail, wherein the rail is coupled to the outer shell of the vehicle and wherein the rail is located approximately half of the height between the top and the bottom of the at least one door; and
    a coupling component that is coupled to the inner surface of the door and is designed to mate with or engage with the C-shaped rail in a slideable manner.

2. The door assembly system of claim 1, wherein the public transportation comprises a bus, train, light rail car or combination thereof.

3. The door assembly system of claim 1, wherein the outer shell comprises metal.

4. The door assembly system of claim 1, wherein the inner passenger compartment comprises plastic, composite or a combination thereof.

5. The door assembly system of claim 1, wherein there are at least two doors.

6. The door assembly system of claim 1, wherein the C-shaped rail is coupled to the outer shell of the vehicle through the use of at least one nut and bolt assembly.

7. The door assembly system of claim 1, wherein the coupling component is coupled to the inner surface of the door through the use of at least one nut and bolt assembly.

8. The door assembly system of claim 1, wherein a coupling component that is coupled to the inner surface of the door releasably mates with or engages with the C-shaped rail in a slideable manner.

9. A method of securely opening a door on public transportation, comprises:
    providing a train, bus or public transportation vehicle having an outer shell and an inner passenger compartment;
    providing at least one door having an outer surface, an inner surface, a top, a bottom and two sides, wherein the door slides to open so that passengers can enter or exit the inner passenger compartment;
    providing at least one connection point that is coupled to the top of the at least one door and mechanically directs the at least one door to open or to close;
    providing a door assembly kit, the kit comprising a C-shaped rail and a coupling component;
    installing the C-shaped rail to the outer shell of the vehicle, wherein the rail is located approximately half of the height between the top and the bottom of the at least one door;
    installing the coupling component to the inner surface of the door, opening the door; and
    mating or engaging the coupling component with the C-shaped rail in a slideable manner.

10. The method of claim 9, wherein the public transportation comprises a bus, train, light rail car or combination thereof.

11. The method of claim 9, wherein the outer shell comprises metal.

12. The method of claim 9, wherein the inner passenger compartment comprises plastic, composite or a combination thereof.

13. The method of claim 9, wherein there are at least two doors.

14. The method of claim 9, wherein the C-shaped rail is coupled to the outer shell of the vehicle through the use of at least one nut and bolt assembly.

15. The method of claim 9, wherein the coupling component is coupled to the inner surface of the door through the use of at least one nut and bolt assembly.

16. The method of claim 9, wherein a coupling component that is coupled to the inner surface of the door releasably mates with or engages with the C-shaped rail in a slideable manner.

* * * * *